(12) United States Patent
Odet

(10) Patent No.: US 10,279,297 B2
(45) Date of Patent: May 7, 2019

(54) BAG FILTER ARRANGEMENT

(71) Applicant: Tetra Laval Holdings & Finance S.A., Pully (CH)

(72) Inventor: Frédéric Odet, La May sur Evre (FR)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 133 days.

(21) Appl. No.: 15/281,936

(22) Filed: Sep. 30, 2016

(65) Prior Publication Data

US 2017/0095763 A1 Apr. 6, 2017

(30) Foreign Application Priority Data

Oct. 1, 2015 (SE) ...................................... 1551260

(51) Int. Cl.
*B01D 46/00* (2006.01)
*B01D 46/02* (2006.01)
*B01D 46/54* (2006.01)

(52) U.S. Cl.
CPC ......... *B01D 46/02* (2013.01); *B01D 46/0005* (2013.01); *B01D 46/543* (2013.01); *B01D 2265/04* (2013.01); *B01D 2271/027* (2013.01)

(58) Field of Classification Search
CPC .. B01D 46/02; B01D 46/543; B01D 2265/04; B01D 2271/027; B01D 46/00–46/546
USPC ................................... 55/361–382, 490–519
See application file for complete search history.

(56) References Cited

U.S. PATENT DOCUMENTS

| 5,045,194 A | 9/1991 | Gershenson |
| 5,755,962 A * | 5/1998 | Gershenson ........... B01D 25/24 210/452 |

FOREIGN PATENT DOCUMENTS

| DE | 10223352 A1 | 12/2003 |
| WO | WO 98/09716 A1 | 3/1998 |

OTHER PUBLICATIONS

Office Action issued by the Swedish Patent and Registration Office (PRV) in Swedish Patent Application No. 1551260-1 dated Apr. 18, 2016; 6 pages.

* cited by examiner

*Primary Examiner* — T. Bennett Mckenzie
(74) *Attorney, Agent, or Firm* — Buchanan Ingersoll & Rooney PC

(57) ABSTRACT

A bag filter arrangement for being arranged in a bag filter holder, comprising a bag filter having an end portion encompassing an open end of the bag filter, a bag filter seal for sealing against the bag filter holder, the bag filter seal being arranged to hold the bag filter, the bag filter seal comprising a bag filter facing surface, and wherein the bag filter seal comprises a recess on the bag filter facing surface, the recess being arranged to receive the open end portion of the bag filter.

14 Claims, 3 Drawing Sheets

BAG FILTER ARRANGEMENT

CROSS-REFERENCE TO RELATED APPLICATIONS

The invention is related to Swedish patent application no. 1551260-1, filed on 1 Oct. 2015, which is incorporated herein by reference.

TECHNICAL FIELD

The present invention relates to a bag filter arrangement for being arranged in a bag filter holder.

BACKGROUND ART

In the food, pharmaceutical and chemical industry, dried and powderized products or intermediate powderized products need to be separated from other undesired components before being packaged or delivered to further processes downstream. A powderized product or intermediate powderized product may henceforth be known as powder product. A known method is to use bag filter downstream of a silo or a hopper which hold and/or store the powder product, and filter the powder product using the bag filter. The powder product is thus fed into the bag filter which is made of different types of material and pore sizes for retaining the desired powder product. The undesired components are thus allowed to pass through the bag filter. The undesired component may be air, i.e. the bag filter may be arranged for separating air and the powder products. The powder product may be fed through the bag filter at high speed utilizing overpressure on the upstream side of the bag filter, or by utilizing a vacuum on the downstream side of the bag filter. Alternatively, the bag filter may be configured to allow the desired powder product to pass the bag filter, while retaining the undesired components. In either case, it is important to seal the edges of the bag filter to a bag filter e.g. the silo or hopper in order to prevent the powder product or undesired components from bypassing the bag filter. This is typically solved using some sort of seal between the bag filter and the bag filter holder.

The seal may be moulded, or use felt or other materials for sealing against a bag filter holder. However, the mentioned options may not provide sufficient attachment to the bag filter itself, or may not be able to combine with certain materials used for the bag filters.

There is thus a need for improving the state of the art to provide a bag filter arrangement which at least partly solves these problems.

SUMMARY

It is an object to improve the current state of the art, to solve at least some of the above problems. These and other objects are achieved by a bag filter arrangement.

According to a first aspect a bag filter arrangement for being arranged in a bag filter holder is provided. The bag filter arrangement comprises: a bag filter having an end portion encompassing an open end of the bag filter; a bag filter seal for sealing against the bag filter holder, the bag filter seal being arranged to hold the bag filter, the bag filter seal comprising a bag filter facing surface; and wherein the bag filter seal comprises a recess on the bag filter facing surface, the recess being arranged to receive the open end portion of the bag filter.

The bag filter arrangement is based on the realization that by providing a recess on a bag filter facing surface, which recess is arranged to receive the open end portion of the bag filter. An improved attachment between the bag filter seal and bag filter may be provided. Further, the bag filter may be attached to the bag filter seal after the manufacturing of the bag filter seal, which enables the bag filter seal and the bag filter to comprise material which were not able to be combine previously. The bag filter arrangement provides an improved seal between the bag filter and the bag filter holder. Further, a bag filter arrangement as described herein may be manufactured at a low cost.

A bag filter holder may be understood as a silo or hopper containing the powder product to be filtered by the bag filter. The bag filter holder may comprises a plate having a hole or opening the general shape of the bag filter seal.

In at least one exemplary embodiment, the bag filter seal comprises an opening, the opening being fluidly connected to an inside of the bag filter. The opening is facing the open end of the bag filter. The opening enables powder to be filtered to enter the bag filter via the opening in the seal.

In at least one exemplary embodiment, the bag filter seal comprises an inner surface extending from the opening to an inside of the bag filter, and wherein the bag filter seal comprises an outer surface extending from the opening to an outside of the bag filter. The shortest path along the inner surface to the bag filter may be shorter than the shortest path along the outer surface to the bag filter. The outer surface may at least partly be facing away from the inside of the bag filter. The inner surface may at least partly be facing an inside of the bag filter.

In at least one exemplary embodiment, the outer surface comprises a sealing protrusion arranged to seal against the bag filter holder. In at least one exemplary embodiment, the sealing protrusion is a first sealing protrusion and wherein the outer surface further comprises a second sealing protrusion arranged to seal against the bag filter holder. Sealing protrusion(s) may improve the sealing between the bag filter seal and the bag filter holder.

In at least one exemplary embodiment, an end portion of the recess is located in proximity second protrusion. For example, the second sealing protrusion may be arranged radially outwardly of the end portion recess. This may provide an increased stiffness of the seal in the proximity of the end portion of the recess and the second sealing protrusion.

In at least one exemplary embodiment, bag filter seal further comprises a nook arranged between the first and the second sealing protrusions. The nook may be construed as a corner, or a concave surface between the first and second sealing protrusions.

In at least one exemplary embodiment, the first sealing protrusion, the nook, and the second sealing protrusion together forms a sealing portion of the bag filter seal, the sealing portion being arranged to seal against the bag filter holder. The sealing portion should the be understood to be arranged to be a receiving portion for an end portion of the bag filter holder which mates with the sealing portion. The first sealing protrusion, the nook, and the second sealing protrusion may provide a snap-lock such that the first and second sealing protrusion snap over edges of an end portion of the bag filter holder.

In at least one exemplary embodiment, the bag filter seal is made of at least one of the following materials: Silicone, PVC (polyvinyl chloride), Rubber. Compared to the prior art which did not provide a freedom of choice in the seal materials, the above materials are more compatible with the powderized food product which may be used with the bag filter. The bag filter seal may be made using the techniques of vulcanisation or extrusion.

In at least one exemplary embodiment, the bag filter comprises a PTFE (polytetrafluoroethylene) membrane, or polyester with or without a PTFE membrane. The bag filter arrangement enables the use of PTFE membranes for the bag filters, and the use of polyester with or without PTFE membranes.

In at least one exemplary embodiment, wherein, in the recess, the end portion of the bag filter is attached to the bag filter seal by at least one row of stitches or adhesive means. The bag filter arrangement, due to the materials which may be used, enables the use of at least one row of stitches to attach the bag filter to the bag filter seal. The row of stitches should be interpreted as a row of stitches around the circumference of the seal, which thus attaches the bag filter in the recess. More than one row of stitches may be used, such as two rows of stitches. The adhesive may be any known and suitable adhesive.

In at least one exemplary embodiment, the bag filter seal extends at least in a radial direction from a center axis of the bag filter arrangement. A central axis of the bag filter arrangement may be understood as a central axis of the bag filter, which passes through the opening of the bag filter seal.

In at least one exemplary embodiment, the seal comprises a top portion and a bottom portion, the top portion having a radial extension greater than a radial extension of the bottom portion, and wherein the bottom portion at least partly encompasses the recess. The top portion may be construed as a support portion which, in use, rests on, and is thus supported by, the bag filter holder. The first sealing protrusion may be positioned on the top portion, the nook may be positioned between the top and bottom portions, and the second sealing protrusion may be positioned on the bottom portion facing radially outwards.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The above objects, as well as additional objects, features and advantages of the bag filter arrangement, will be more fully appreciated by reference to the following illustrative and non-limiting detailed description of preferred embodiments of the present invention, when taken in conjunction with the accompanying drawings, wherein.

DETAILED DESCRIPTION

In the present detailed description, embodiments of a bag filter arrangement are mainly discussed with reference to views only showing components and portions being relevant in relation to various embodiments of the bag filter arrangement. It should be noted that this by no means limits the scope of the bag filter arrangement, which is also applicable in other circumstances for instance with other types or variants of bag filter arrangements and processes than the embodiments shown in the appended drawings. Further, that specific features are mentioned in connection to an embodiment of the bag filter arrangement does not mean that those components cannot be used to an advantage together with other embodiments of the bag filter arrangement.

Figure 3A:
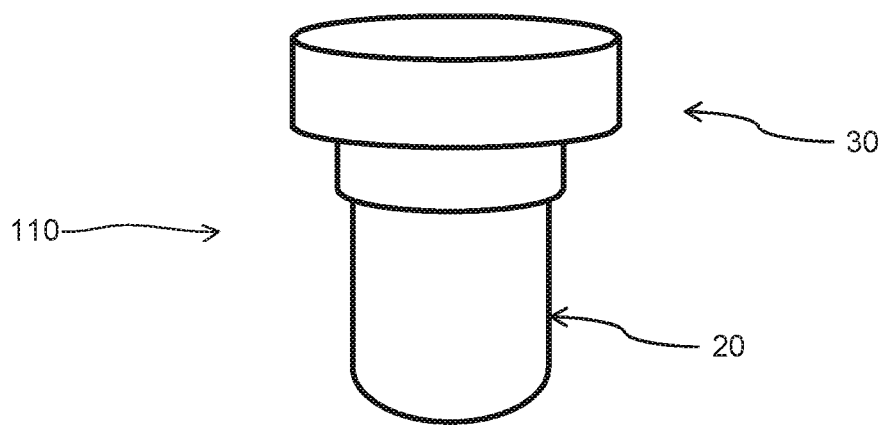
FIG. 3a is a perspective view of an exemplary embodiment.
Figure 3B:
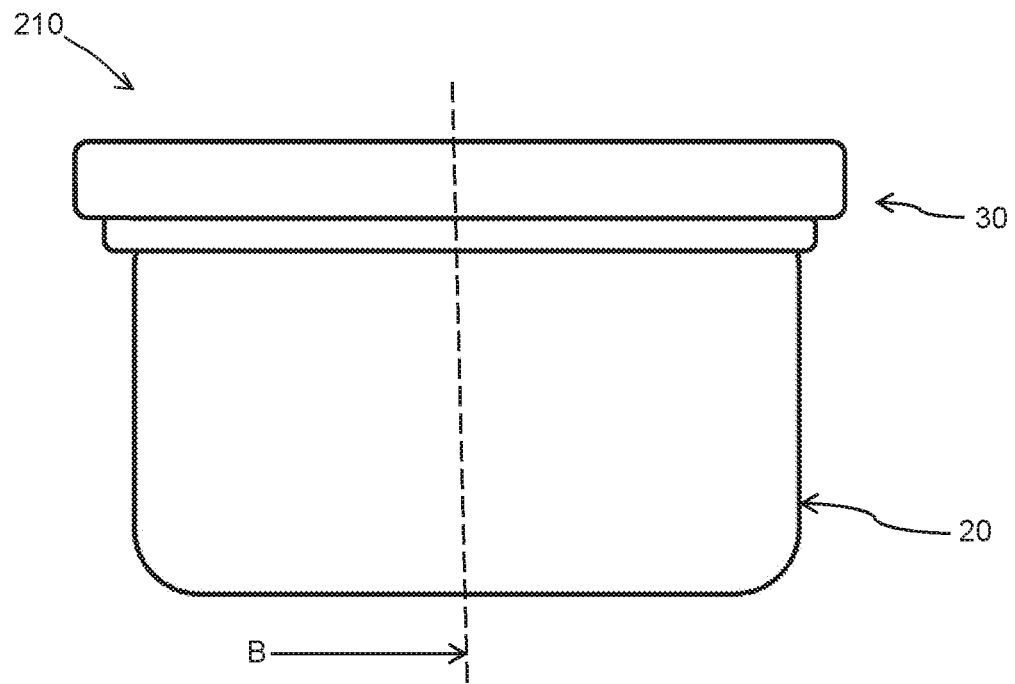
FIG. 3b is a side view of an exemplary embodiment.

The bag filter arrangement is suitable for being installed in an industrial food production facility, or pharmaceutical production facility, or chemical production facility, for filtering powder products. When a powder product is transported through the bag filter seal, and bag filter, undesired particles with a small size are allowed to pass the bag filter. The bag filter thus collects the desired powder products. Another mode of operation is of course that the powder product is allowed to pass through the bag filter, the bag filter being configured to allow the powder food product to pass through, and the bag filter collects the undesired particles. The powder product may be fed using pneumatic means and possible an overpressure, or by utilizing an under pressure, e.g. partial vacuum such as less than 1 kilo Pascal, on the downstream side of the bag filter arrangement. The powder product is thus filtered and may be transferred to further processes downstream such as different treatments and/or packaging. The bag filter arranged may be used for either a round, e.g. circular bag filter arrangement or an elongated, e.g. a flattened, bag filter arrangement. An embodiment of a round bag filter arrangement 30 is shown in FIG. 3a, and an elongated bag filter arrangement 40 is shown in FIG. 3b.

Figure 1:
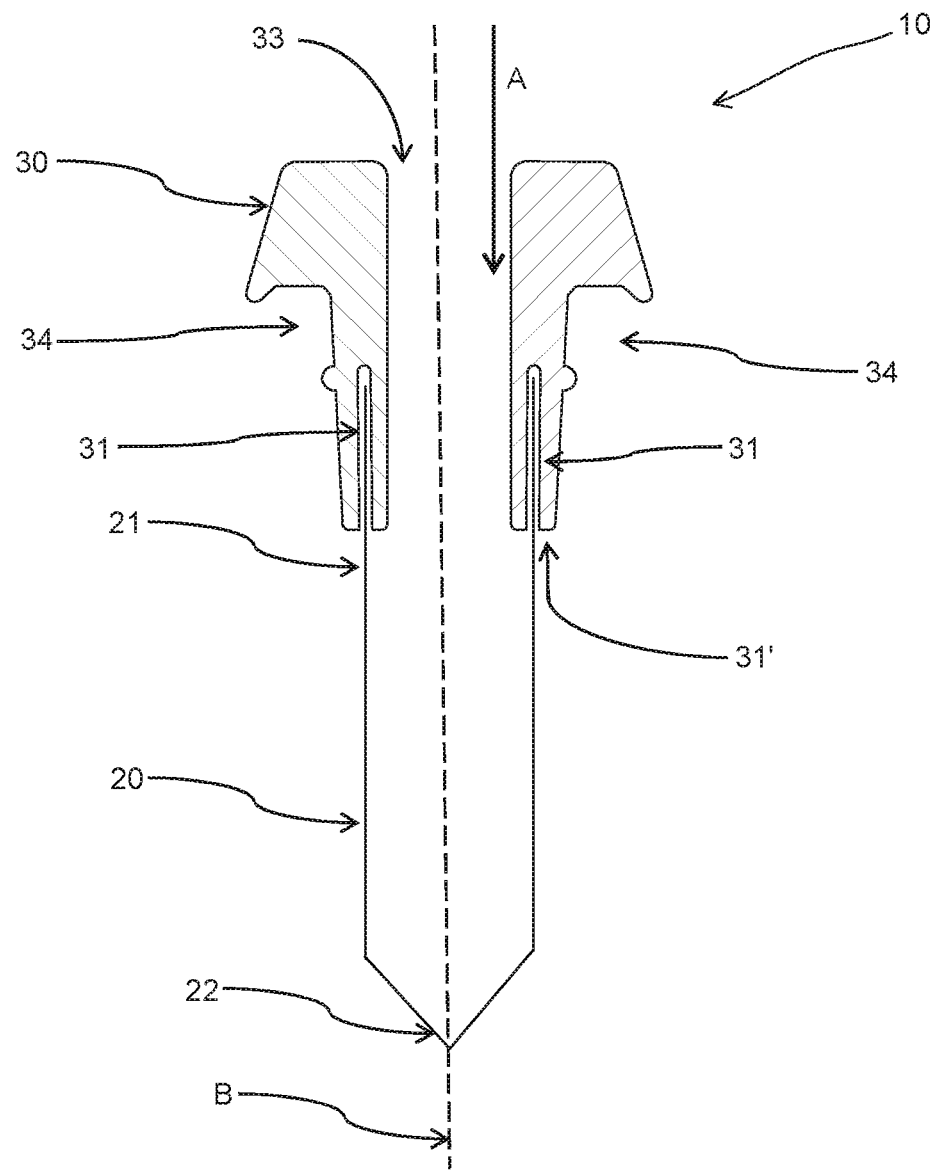
FIG. 1 is a cross-sectional view of a bag filter arrangement in accordance with an exemplary embodiment.

FIG. 1 shows a cross-sectional view of a bag filter arrangement 10 in accordance with an exemplary embodiment. The bag filter arrangement 10 comprises a bag filter 20 and a bag filter seal 30. The bag filter seal has a center axis B. The bag filter 20 and bag filter seal 30 extends in a radial direction from the center axis B. The bag filter seal 30 typically extends further in a radial direction than the bag filter 20. Whereas the bag filter typically extends further in an axial direction along the center axis B than the bag filter seal 30.

The bag filter 20 has an open end portion 21 and a closed end portion 22 opposite the open end portion 21. The closed end portion 22 may be closed by stitching or by using an adhesive. The bag filter 20 may comprise a PTFE membrane. For example, the bag filter 20 may be made of polyester with or without a PTFE membrane. The bag filter 20 may be made of any other known bag filter materials. The length of the bag filter 20, seen as the vertical direction in FIG. 1, may be in the range of 500 mm to 1500 mm.

The bag filter seal 30 comprises a recess 31 for receiving the open end portion 21 of the bag filter. The recess 31 is arranged on a bag filter facing surface 31' of the bag filter seal 30. The open end portion 21 may be attached in the recess 31 by either a row of stitches or by using an adhesive. Alternatively, both stitches and an adhesive may be used. The row of stitches may be a row of stitches around the circumference of the bag filter seal 30. In exemplary embodiments, at least two rows of stitches may be used. When using more than one row of stitches, the rows of stitches are preferably spaced apart. The bag filter seal 30 may be made of silicone, PVC, or rubber. The length of the closed end portion 21 which is inserted in the recess 31 may be in the range of 10 mm to 40 mm.

The bag filter seal 30 further comprises an opening 33 in the top of the bag filter seal which is fluidly connected to the open end 21 of the bag filter 20. A powder product may be introduced into the bag filter 20 be being transported through the bag filter seal via the opening into the bag filter 20 in the direction indicated by the arrow A in FIG. 1. The width, e.g. the diameter if the opening 33 is circular, may be in the range of 20 mm to 40 mm. The width of the elongated opening 33 discussed with reference to FIG. 3b may also be in the range of 20 mm to 40 mm. The bag filter seal 30 further comprises a sealing portion 34. The sealing portion is arranged on the outside of the bag filter seal 30. The sealing portion 34 is the portion of the bag filter seal 30 which, in use, seals the bag filter arrangement 10 against the bag filter holder (not shown) such that a powder product is prevented from bypassing the bag filter arrangement 10.

Figure 2:
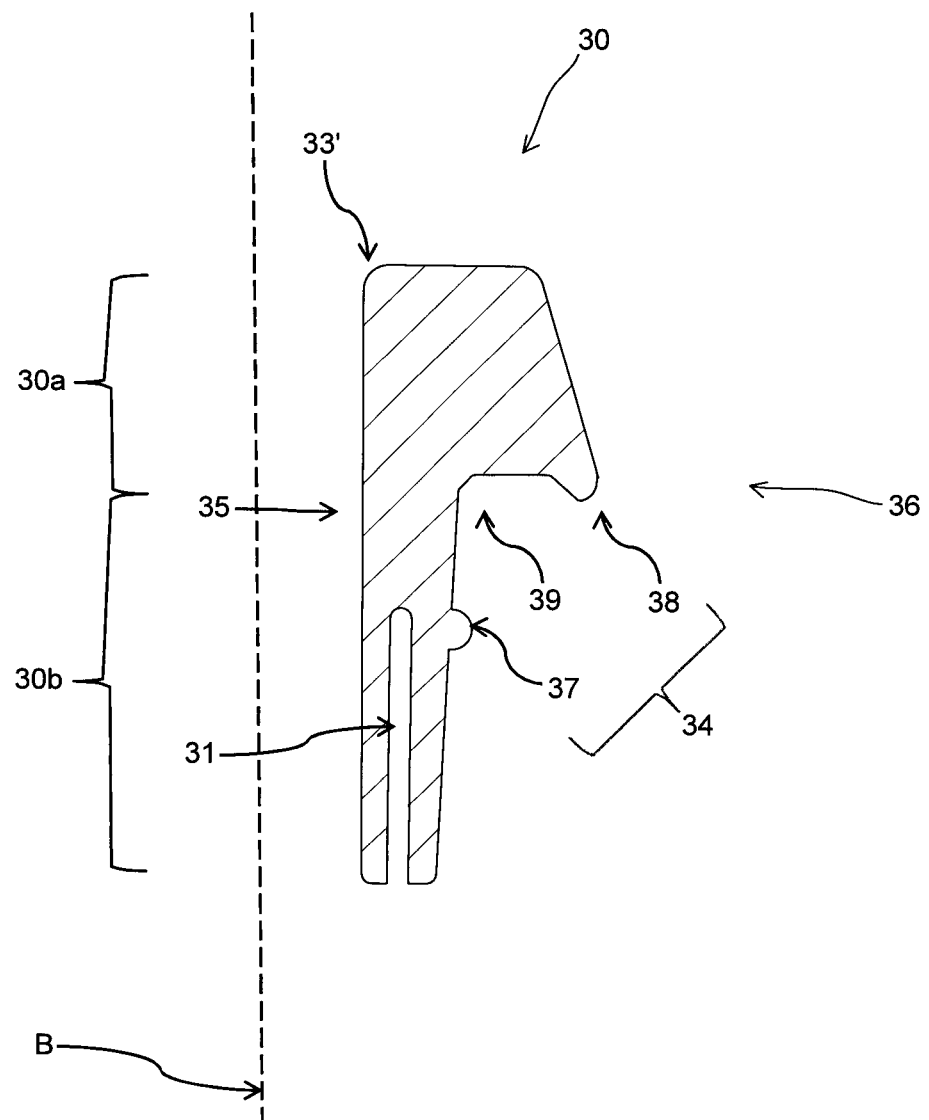
FIG. 2 is a cross-sectional view of a bag filter arrangement in accordance with an exemplary embodiment.

FIG. 2 shows an enlarged view the bag filter seal 30. The bag filter seal 30 has an inner surface 35 and an outer surface 36. Note that the path from where the opening begins, marked by 33' in FIG. 2, is shorter along the inner surface 35 than along the outer surface 36. This is because the outside, e.g. the outer surface 36, of the bag filter seal 30 comprises a number of features for further improving the sealing effect between the bag filter seal 30 and a bag filter holder (not shown).

The outer surface 36 of the bag filter seal 30 comprises a first sealing protrusion 37. The first sealing protrusion 37 may be, and as shown in FIG. 2, arranged at the same height, being the vertical direction in FIG. 2, as the end of the recess 31. Thereby, the stiffness of the bag filter seal 30 may be increased in proximity of the end of the recess and the first sealing protrusion 37. The first sealing protrusion 37 may protrude substantially in a radial direction from the central axis B of the bag filter arrangement 10.

The outer surface 36 of the bag filter seal 30 further comprises a second sealing protrusion 38. The second sealing protrusion 38 is arranged spaced apart from the first sealing protrusion 37. The second sealing protrusion 38 may protrude substantially in an axial direction of the central axis B. In other words, the second sealing protrusion 38 may extend downwards as seen in FIG. 2.

The outer surface 36 of the bag filter seal 30 further comprises a nook 39. The nook 39 is arranged between and spaced apart from the first and second sealing protrusions 37, 38. The nook 39 may also be construed as a corner located radially inwards, as seen from the central axis B, from the second sealing protrusion, and located axially upwards along the central axis B as seen in FIG. 2.

The first sealing protrusion 37, the second sealing protrusion 38, and the nook 39 may be understood as the sealing portion 34 of the bag filter seal 30 which is arranged to seal against a bag filter holder (not shown). The sealing portion 34 may be arranged to snap lock, or at least improve the attached to the bag filter holder by being flexible and resilient.

The bag filter seal 30 may alternatively be described as having a top portion 30a and a bottom portion 30b. The top portion has a greater radial extension than the bottom portion 30b. The bottom portion 30b comprises the recess 31 and the first sealing protrusion 37. The bottom portion 30b at least partly encompasses the recess 31. The top portion 30a comprises the second sealing protrusion 38. The nook 39 is arranged between the top 30a and the bottom portion 30b.

FIG. 3a shows a perspective view of a round bag filter arrangement 110 according one embodiment. The round bag filter arrangement 110 comprises a bag filter 20 which has been inserted into a recess of the bag filter seal 30 and attached. The bag filter 20 and bag filter seal 30 are the same elements as described above in conjunction with FIGS. 1 and 2. A round bag filter arrangement 110 may typically only mounted vertically.

FIG. 3b shows a perspective view of an elongated flat bag filter arrangement 210 according one embodiment. The flat bag filter arrangement 210 has an elongated cross section perpendicular to the direction of the center axis B. The elongated flat bag filter arrangement 210 comprises a bag filter 20 which has been inserted into a recess of the bag filter seal 30 and attached. The bag filter 20 and bag filter seal 30 are the same elements as described above in conjunction with FIGS. 1 and 2. An elongated flat bag filter arrangement as shown in FIG. 3b may typically be mounted both vertically and horizontally. In order to mount the bag filter arrangement 210 horizontally, a rigid support structure may be inserted into the bag filter 20 through the opening in the bag filter seal 30.

It is of course understood that variations to the shown embodiment may be effected and still be within the scope of the invention described herein, for example the bag filter or bag filter seal may be made of other known materials.

The skilled person realizes that a number of modifications of the embodiments described herein are possible without departing from the scope of the invention, which is defined in the appended claims.

The invention claimed is:

1. A bag filter arrangement configured to be arranged in a bag filter holder to filter powder product, the bag filter arrangement comprising:
 a bag filter configured to filter the powder product, the bag filter possessing an open end at one axial end of the bag filter through which the powder product is introduced into an interior of the bag filter and a closed end at an opposite axial end of the bag filter in an axial direction, the open end of the bag filter being encompassed by an end portion of the bag filter, the end portion of the bag filter possessing an interior surface facing towards the interior of the bag filter and an opposite exterior surface facing away from the interior of the bag filter;
 a bag filter seal configured to seal against the bag filter holder, the bag filter seal possessing a central axis, the bag filter seal possessing a first end portion that terminates at an open first end at one axial end of the bag filter seal and a second end portion that terminates at an open second end at an opposite axial end of the bag filter seal, the first and second end portions of the bag filter seal being open, the bag filter seal possessing an inner surface extending from the open second end of the bag filter seal to the interior surface of the bag filter, the bag filter seal also possessing an outer surface extending from the open second end of the bag filter seal to the exterior surface of the bag filter;
 the bag filter seal including a first sealing protrusion projecting radially outwardly from the outer surface of the bag filter seal to seal against the bag filter holder and a second sealing protrusion projecting axially downward from the outer surface of the bag filter seal toward the first end portion of the bag filter seal to seal against the bag filter holder, the second sealing protrusion being spaced apart from the first sealing projection in the axial direction;
 the first end portion of the bag filter seal including an axially extending groove that is open at one end and closed at an opposite end;
 the end portion of the bag filter which encompasses the open end of the bag filter being positioned in the axially extending groove of the bag filter seal and being attached to the bag filter seal so that the open second end portion of the bag filter seal communicates with the interior of the bag filter, and so that both the interior and exterior surfaces of the end portion of the bag filter face portions of the bag filter seal;

the axially extending groove overlaps the first sealing protrusion in the axial direction; and the axially extending groove is spaced apart from the second sealing protrusion to avoid overlapping the second sealing protrusion in the axial direction.

2. A bag filter arrangement according to claim 1, the bag filter seal further comprising a nook between the first and second sealing protrusions.

3. A bag filter arrangement according to claim 1, wherein the end portion of the bag filter is attached to the bag filter seal by stitches or adhesive.

4. A bag filter arrangement according to claim 1, wherein the open first end of the bag filter seal is fluidly connected to the interior of the bag filter, the bag filter seal possessing an inner surface extending from the open first end of the bag filter seal to the interior of the bag filter, the bag filter seal also possessing an outer surface extending from the open first end of the bag filter seal to the exterior surface of the bag filter, the outer surface of the bag filter seal comprising a sealing protrusion configured to seal against the bag filter holder, the sealing protrusion protruding substantially in a radial direction from a central axis of the bag filter arrangement.

5. The bag filter arrangement according to claim 1, wherein the second sealing protrusion is positioned further radially outwardly of the central axis of the bag filter seal than the first sealing protrusion.

6. The bag filter arrangement according to claim 1, wherein the first sealing protrusion is positioned closer to the open second end of the bag filter seal than the second sealing protrusion considered with reference to the axial direction.

7. The bag filter arrangement according to claim 1, wherein the first sealing protrusion possesses a lower edge in the axial direction and an upper edge opposite the lower edge in the axial direction, the upper edge being closer to the second end portion of the bag filter seal in the axial direction, and a portion the axially extending groove axially extends beyond the lower edge of the first sealing protrusion so that the portion of the axially extending groove is closer to the second end portion of the bag filter seal than the lower edge of the first sealing protrusion in the axial direction.

8. A bag filter arrangement configured to be arranged in a bag filter holder to filter powder product, the bag filter arrangement comprising:

a bag filter configured to filter the powder product, the bag filter possessing an open end at one axial end of the bag filter through which the powder product is introduced into an interior of the bag filter and a closed end at an opposite axial end of the bag filter, the open end of the bag filter being encompassed by an end portion of the bag filter, the end portion of the bag filter possessing an interior surface facing towards the interior of the bag filter and an opposite exterior surface facing away from the interior of the bag filter;

a bag filter seal configured to seal against the bag filter holder, the bag filter seal possessing a central axis, the bag filter seal possessing a first end portion that terminates at an open first end at one axial end of the bag filter seal and a second end portion that terminates at an open second end at an opposite axial end of the bag filter seal, the first and second end portions of the bag filter seal being open;

the first end portion of the bag filter seal including an axially extending groove that is open at one end and closed at an opposite end;

the end portion of the bag filter encompassing the open end of the bag filter being positioned in the axially extending groove of the bag filter seal and being attached to the bag filter seal so that the open second end portion of the bag filter seal communicates with the interior of the bag filter, and so that both the interior and exterior surfaces of the end portion of the bag filter face portions of the bag filter seal;

the open first end of the bag filter seal being fluidly connected to the interior of the bag filter, the bag filter seal possessing an inner surface extending from the open first end of the bag filter seal to the open second end of the bag filter seal;

the inner surface of the bag filter seal extending from the open first end of the bag filter seal to the interior of the bag filter;

the bag filter seal possessing an outer surface extending from the open first end of the bag filter seal to the exterior surface of the bag filter;

the outer surface of the bag filter seal comprising a first sealing protrusion configured to seal against the bag filter holder, the first sealing protrusion protruding substantially in a radial direction from a central axis of the bag filter arrangement;

the outer surface of the bag filter seal comprising a second sealing protrusion configured to seal against the bag filter holder, the second sealing protrusion protruding substantially axially from the outer surface of the bag filter seal to seal against the bag filter holder; and the second sealing protrusion being positioned further radially outwardly of the central axis of the bag filter seal than the first sealing protrusion.

9. The bag filter arrangement according to claim 8, wherein the first sealing protrusion possesses a lower edge in the axial direction and an upper edge opposite the lower edge in the axial direction, the upper edge being closer to the second end portion of the bag filter seal in the axial direction, and a portion the axially extending groove axially extends beyond the lower edge of the first sealing protrusion so that the portion of the axially extending groove is closer to the second end portion of the bag filter seal than the lower edge of the first sealing protrusion in the axial direction.

10. A bag filter arrangement according to claim 8, the bag filter seal further comprising a nook between the first sealing protrusion and the second sealing protrusion.

11. A bag filter arrangement according to claim 8, wherein the first sealing protrusion is positioned closer to the open second end of the bag filter seal than the second sealing protrusion.

12. A bag filter arrangement according to claim 8, wherein the first sealing protrusion axially overlaps a portion of the axially extending groove in the bag filter seal.

13. A bag filter arrangement according to claim 8, wherein the first sealing protrusion axially overlaps a portion of the axially extending groove in the bag filter seal.

14. A bag filter arrangement according to claim 8, wherein the end portion of the bag filter is attached to the bag filter seal by stitches or adhesive.

\* \* \* \* \*